Feb. 26, 1929.   1,703,527
P. P. HENSHALL
PROCESS OF MANUFACTURING RADIATORS
Filed March 6, 1928   3 Sheets-Sheet 1
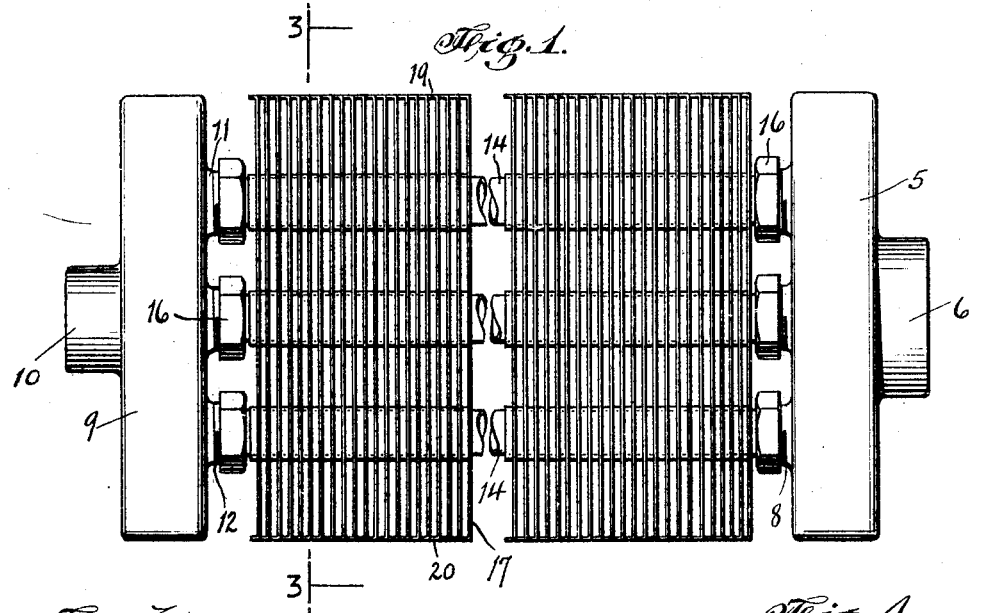
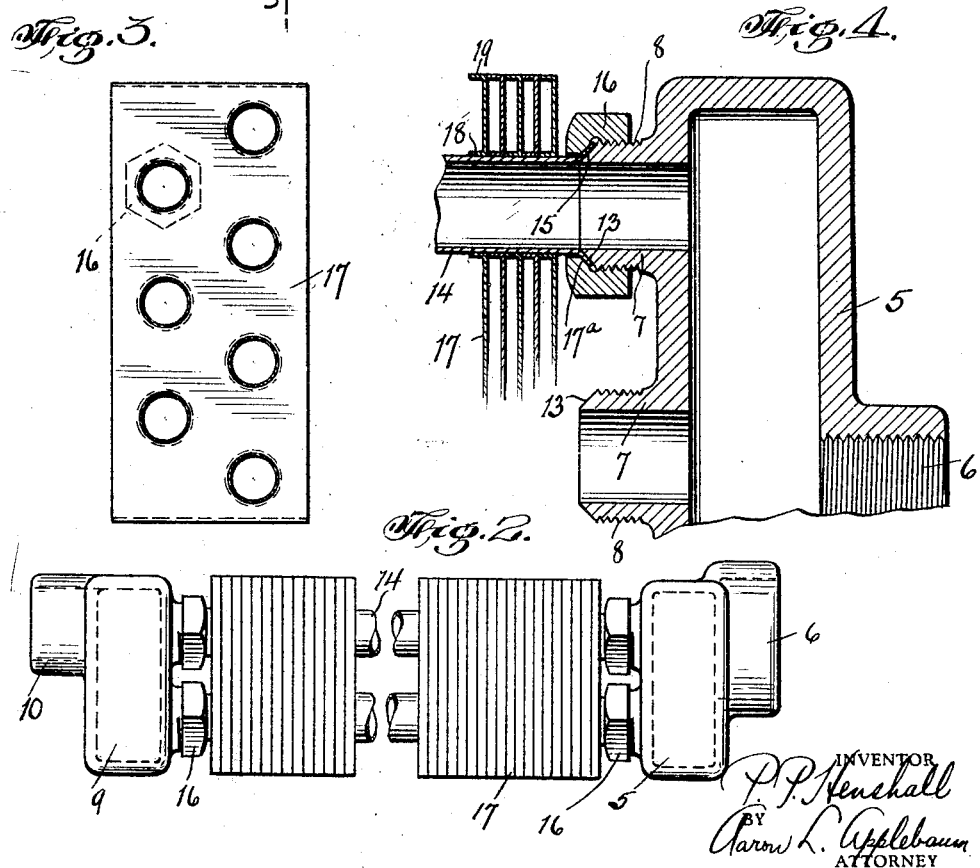

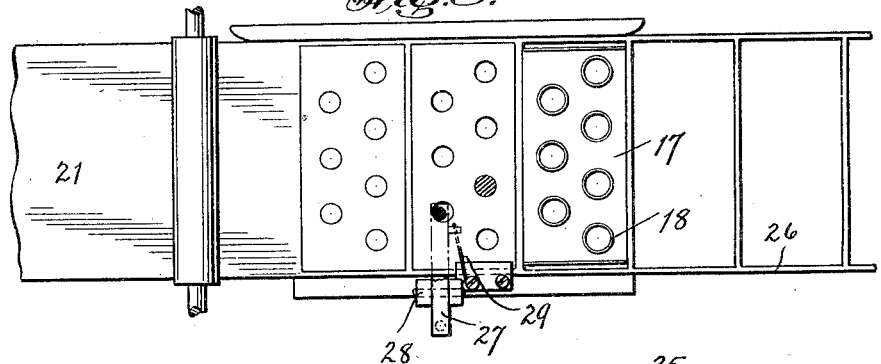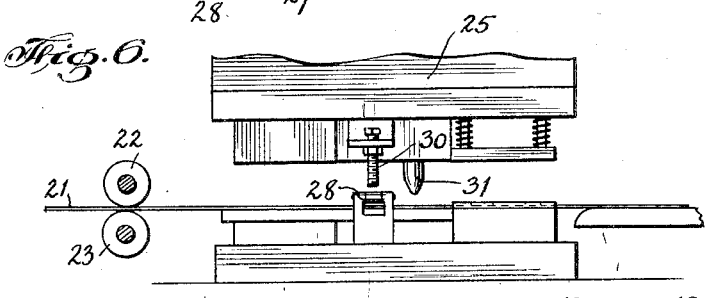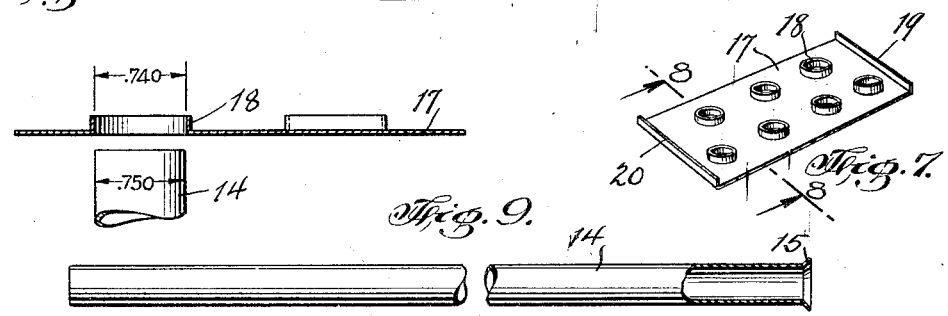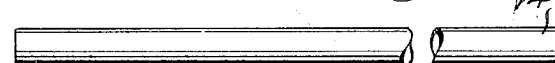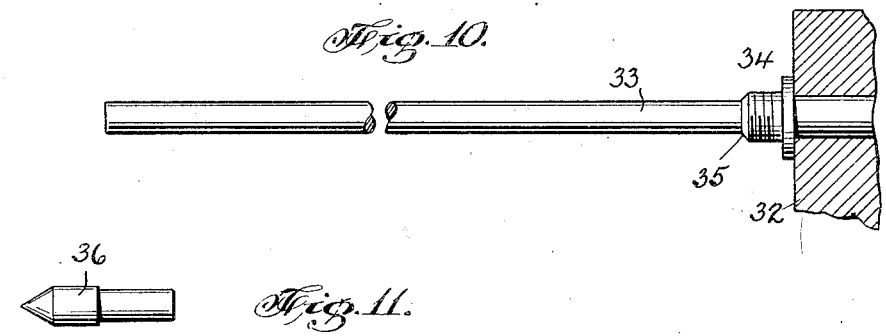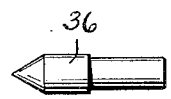

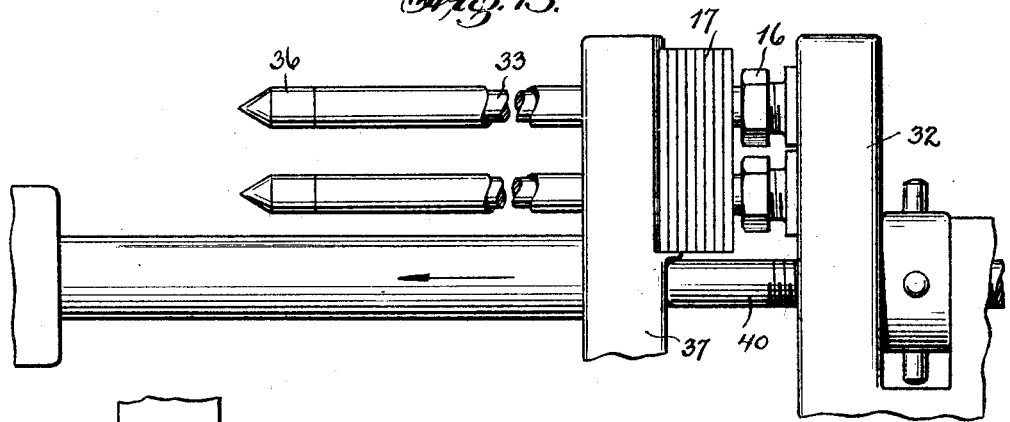
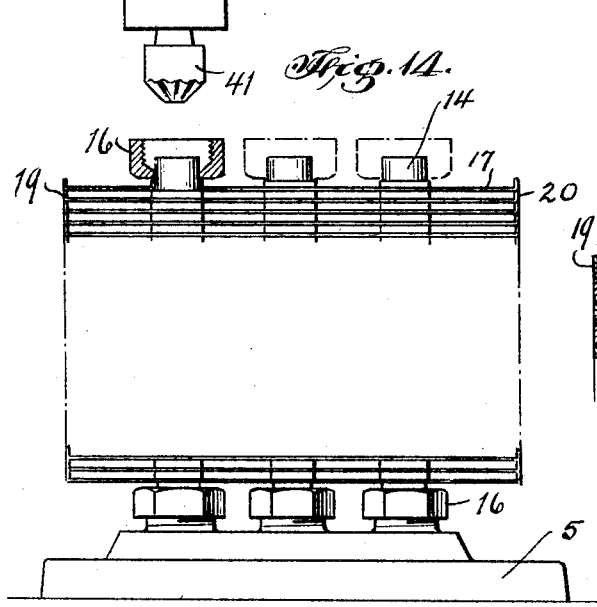
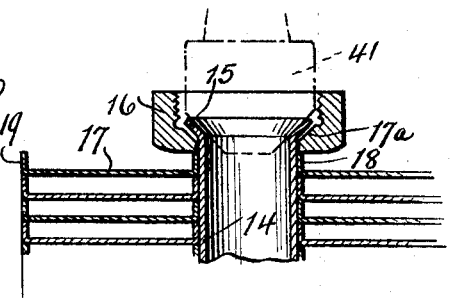

Patented Feb. 26, 1929.

1,703,527

UNITED STATES PATENT OFFICE.

PERCIVAL P. HENSHALL, OF PHILADELPHIA, PENNSYLVANIA, ASSIGNOR TO JOHN J. NESBITT, INC., OF PHILADELPHIA, PENNSYLVANIA, A CORPORATION OF NEW JERSEY.

PROCESS OF MANUFACTURING RADIATORS.

Application filed March 6, 1928. Serial No. 259,568.

This invention relates to improvements in radiators and more particularly in a novel and improved method of constructing and assembling the fluid or heat conducting pipes and plates to inlet and return headers.

One of the objects of my invention is to construct and assemble a series of closely associated heat conducting plates on a series of pipes connecting an inlet and a return header without resorting to soldering, galvanizing or other binding mediums.

Another object of my invention is to provide in a radiator a series of fluid conducting tubes and closely associated heat conducting plates constructed and arranged in perfect thermal contact therewith including provision for joining or connecting the ends of said tubes to an inlet and return header according to a novel method in its manufacture.

To enable others skilled in the art to more fully comprehend the underlying features of my novel and improved method and the resulting construction obtained, reference is had to the accompanying drawing wherein:

Fig. 1 is a top plan of the radiator showing the end headers and plates.

Fig. 2 is a front view.

Fig. 3 is a view taken on the line 3—3 of Fig. 1.

Fig. 4 is an enlarged partial sectional view showing the end header and pipe connection.

Fig. 5 is a top plan showing the plate blanking, indexing and forming operation.

Fig. 6 is a front view of the ram or press head or die for blanking, indexing and forming the plates.

Fig. 7 is a perspective view showing one of the completed plates.

Fig. 8 is a sectional view taken on the line 8—8 of Fig. 7.

Fig. 9 is a view partly in section of one of the fluid conducting pipes.

Fig. 10 is a view showing one of the stationary pipe mandrels.

Fig. 11 is a view of a leader center for the fluid conducting pipe when positioned on the mandrel.

Fig. 12 is a view partly in section showing the fluid conducting tubes on the mandrel and their relation to the jig plate.

Fig. 13 is a view showing the operation of the jig plate.

Fig. 14 is a view showing ends of the fluid conducting tubes before they are spun.

Fig. 15 is a sectional view showing the spun end of a fluid conducting tube and the lock nut thereon.

Referring particularly to Figs. 1 to 4 inclusive, the structural features of my improved radiator consist of a steam inlet header 5, preferably of cast iron, having an outer threaded tap 6 of substantial diameter, and a series of inner bosses 7, each of said bosses being externally threaded as at 8. A return header 9, also preferably of cast iron, is equipped with a threaded tap 10, somewhat less in diameter than the diameter of the tap 6 of the opposite header. The length and width of the respective headers are of the same dimensions but the thickness or depth of the return header 9 is slightly less than the inlet header 5. However the size and dimensions of the headers may be varied and altered as manufacturing necessities and particular conditions and circumstances require.

The return header 9 is provided with a series of similar bosses 11, externally threaded as at 12, and located in the same position as the bosses of the inlet header 5. The diameter of the bore of each of the bosses of both headers is uniform throughout, it being noted that each boss is formed with a shoulder 13 disposed at an angle of substantially 45 degrees, for a purpose presently to be explained.

Connecting the bosses of the respective headers are a series of fluid conducting pipes 14, preferably of copper tubing and of the same diameter as the bore of the bosses, above referred to. Each end of the tubes is flared outwardly, as at 15, being connected to the threaded boss by an interiorly threaded brass lock nut 16. The lock nut is formed with a shoulder 17ª which is beveled substantially 45 degrees so as to bear against the spun end of the tube and fasten or clamp it tightly on the shoulder 13 of the boss, and thus making it pressure tight for the internal circulation of the heating medium. The lock nuts 16 are of course, first loosely positioned, on the ends of the tubes before they are spun. In one embodiment of my invention, I have provided headers with a series of seven bosses and fluid conducting, connecting tubes or pipes, the said bosses and tubes being positioned in a somewhat zig-zag formation. The steam inlet tap and the return tap are of such diameter relative to the diameters of the bosses and connecting tubes, and are so located relative thereto as to prevent the formation of an air pocket in the radiator. However, while I have referred to a particular number of bosses and connecting tubes, this may be varied depending on the size and type of radiator desired.

In order to increase the heating surface area of the radiator, I have provided the connecting tubes with a series of closely associated, spaced copper plates or fins 17, each of said plates or fins having a series of flanges or shoulders 18, the interior diameter of which are slightly less than the exterior diameter of the tubes. The ends of the plates or fins 17 are formed with flanges 19, 20 which are of the same height as the flanges or shoulders 18, thus uniformly spacing all of said plates or fins on the tubes throughout the length of the radiator. The number of plates employed in a radiator of this type may thus be varied depending upon the height of the shoulders and the end flanges 19, 20. Under certain conditions where a larger or smaller surface area is required for each plate, the number employed and their relative spacing may be determined in order to obtain the maximum efficiency.

Various means have heretofore been resorted to in the manufacture of the plate or fin type of radiator. One of the greatest difficulties experienced is in producing thermal contact between the fluid conducting tubes or pipes and the plates or fins. This has been accomplished to an unsatisfactory degree by dipping, or soldering and in other instances by employing a binder at the contact surface. These practices have not proved commercially successful both as to cost of manufacture and low efficiency.

The process and method employed in the construction and assembly of the radiator above described overcomes the above objections and others which will be more readily apparent to those skilled in the art wherein it is desired to produce a light, inexpensive yet highly efficient radiator. Referring particularly to Figs. 5 and 6 of the drawing, there is shown a specially constructed die for blanking, indexing and forming the plates, ready for assembly on the radiator tubes as above illustrated. A strip of sheet copper 21, rolled to a thickness of .013" is passed between rollers 22, 23 below the press 24. The press head 25 is provided with a blanking surface, an intermediate indexing and a flange forming section whereby at each operation or stroke of the press, a complete plate is formed, the waste or trimming 26 continuing to the scrap. On the first operation, the holes are blanked to $\frac{15}{32}$" and the plate is blanked to 8¼" in length by 3½" in width. The plate is advanced to an indexing operation. A lever 27 pivotally connected and mounted as at 28, is engaged by a spring 29 so that when the stock blank moves forward, the lever 27 by reason of the spring pressure drops into one of the $\frac{15}{32}$" holes and indexes. The press is then tripped and when the ram comes down, a trip pin 30 disengages the lever 27. At the same time a locating or centering pin 31 enters another one of the $\frac{15}{32}$" holes and definitely locates the blank for the flange forming and stamping operation. It will thus be seen that upon each stroke of the press, a complete plate is cut from the strip of stock 21. In the forming operation, the dies produce a shoulder flange, the inside diameter of which is substantially .740" and the height ⅛". The stock is of specially rolled soft copper which allows for forming of the flange without first notching and the pressure pad in the first or blanking operation irons out the stock and makes it perfectly flat.

While the inside diameter of the shoulder flange 18 is .740", the outside diameter of the copper tube, over which the plates are forced is .750" or .010" larger than the inside diameter referred to. Consequently, the assembly of the plates on the tubes without the necessity of soldering, dipping or employing a binding agent, produces perfect thermal contact.

To accomplish this operation, I employ a stationary block 32 having a series of fixed mandrels 33 located in the same position as the bosses of the end headers and the shoulder flanges of the plates. The mandrels are each formed with a threaded shoulder 34 and a beveled face 35 of 45 degrees. One end of each of the tubes 14 are first spun after which the tubes are positioned on the said mandrels with the spun ends flush with the beveled faces of the respective shoulders. The brass lock nuts are then threaded on the shoulders of the mandrel, thus locking all of the tubes in position. The tubes 14 being somewhat longer than the mandrels, leader centers 36 are positioned in the ends of said tubes, said centers being turned at a 60 degree angle in order to locate or find the respective openings or holes in the movable jig plate 37.

Referring to Figs. 12 and 13, it will be noted that the jig plate is provided with a plate supporting shelf 38 on which the plate is first positioned before it is forced over the mandrels and the copper tubes thereon. After considerable experimenting, I have found that a pressure of substantially 2,800 pounds is required to drive the plates over the tubes without splitting the flanged shoulders by reason of the varying dimensions between the outside diameter of the tubes and the inside diameter of the flanged shoulder as above referred to. When so forced on the tubes, the flanges are practically fused with the tubes throughout their entire surface, thereby producing a body to body contact and thus obviating the necessity of soldering, galvanizing or employing a binding medium.

After each plate is forced or driven on the tubes, a screw 40 is advanced by means of its thread by rotating the same a definite distance, equal to the height of the flanged shoulder and the end flanges of the plate so that when the succeeding plates are forced on the tubes, the plates will not jam or become distorted, and thus each plate is uniformly spaced in contiguous relation to the next adjacent plate throughout the entire length of the radiator.

After the required number of plates are thus positioned on the tubes, the lock nuts 16 may be unthreaded from the threaded shoulders of the mandrels and then threaded to the bosses of an end header. After this operation, lock nuts 16 are positioned on the opposite ends of the tubes whereupon said ends of the tubes are spun by a beveled tool 41 as shown by Figs. 14 and 15. The ends of the tubes may all be spun simultaneously or individually as the shop practice requires. After the opposite ends of the tubes are spun, the opposite end header may be positioned, the lock nuts forcing the spun ends of the tubes into intimate contact with the faces of the bosses as the nuts are tightened.

While in actual practice the thickness of the steam inlet header is slightly greater than that of the return or outlet header, it should be noted that the respective bosses of both headers and the fluid conducting tubes all lie in a parallel plane and when the lock nuts are tightened, the steam or liquid tight joints produced are capable of consistently standing a test of over 100 pounds pressure. Another variation in the headers may reside in the diameter of the inlet header tap and the outlet tap of the return header which depend upon the various sizes of the standard pipes required in the heating system.

Having shown and described my invention, what I claim as new and desire to secure by Letters Patent is:—

1. The method of manufacturing radiators which consists in stamping and forming a plate with a shoulder, driving said plate on a hollow tube having an outside diameter greater than the inner diameter of the shoulder to produce a body to body contact between said tubes and shoulder, and connecting the ends of said tube to an inlet and a return header.

2. The method of manufacturing radiators which consists in stamping and forming a series of plates with a plurality of shoulders, driving said plates on a series of hollow tubes, each having an outside diameter greater than the inner diameter of the shoulders to produce body to body contact between said tubes and shoulders, and locking the ends of said tubes to an inlet and a return header.

3. The method of manufacturing radiators which consists in stamping and forming a series of plates with a plurality of shoulders and top and bottom flanges, forcing said plates into contiguous spaced relation on a series of hollow tubes each having an outside diameter greater than the inner diameter of the shoulders and connecting the ends of said tubes to an inlet and a return header.

4. The method of manufacturing radiators which consists in stamping and forming a series of plates with a plurality of staggered shoulders and top and bottom flanges, successively driving said plates with their shoulders and flanges into contiguous spaced relation on a series of hollow tubes each having a diameter greater than the inner diameter of the said shoulders to produce body to body contact between said tubes and shoulders, and then locking the ends of said tubes to an inlet and a return header.

5. The method of manufacturing radiators which consists in stamping and forming a series of plates with a plurality of shoulders and top and bottom flanges, driving said plates with their shoulders and flanges into contiguous spaced relation throughout the length of a series of hollow tubes each having a diameter greater than the inner diameter of the said shoulders to produce body to body contact between said tubes and shoulders, flaring the ends of said tubes and then locking both ends of said tubes to an inlet and a return header.

6. The method of manufacturing radiators which consists in stamping and forming a series of plates with a plurality of shoulders in staggered relation and with top and bottom flanges, driving said plates successively by pressure with their shoulders and flanges into contiguous spaced relation throughout the length of a series of stationary hollow tubes each having a diameter greater than the inner diameter of the said shoulders, flaring the ends of said tubes and then locking both ends of said tubes to a series of bosses on an inlet and a return reader.

7. The method of manufacturing radiators which consists in stamping, indexing and forming a series of copper plates with a plurality of shoulders in staggered relation and with top and bottom flanges, driving said plates successively by pressure on a series of stationary hollow tubes with the shoulders and flanges in contiguous, contacting relation throughout the length of the tubes, positioning locking nuts on the ends of said hollow tubes and then locking the said ends of the tubes to the bosses of an inlet and return header.

8. The method of manufacturing radiators which consists in stamping, indexing and forming a series of copper plates with a plurality of shoulders and top and bottom flanges, positioning a series of hollow tubes in parallelism and temporarily locking one end of each tube, then driving the said plates successively by pressure on the tubes so that the shoulders and flanges are in abutting, contacting relation with each other and the surface of the tubes, removing the tubes and plates as a unit and then connecting the ends of said tubes to the bosses of an inlet and return header.

9. The method of manufacturing radiators which consists in stamping, indexing and forming a series of copper plates with a plurality of shoulders and top and bottom flanges, positioning a series of hollow tubes in parallelism and temporarily locking one end of each tube, then driving the said plates successively by pressure, a predetermined distance on the tubes so that the shoulders and flanges are in abutting, contacting relation with each other and the surface of the tubes, disconnecting the locking means for the ends of the tubes and then locking both ends of the tubes to the bosses of an inlet and return header.

10. The method of manufacturing radiators which consists in stamping, indexing and forming a series of copper plates with a plurality of shoulders and top and bottom flanges, flaring the ends of a series of copper tubes and temporarily locking the said flared ends so that the tubes all lie in parallelism, driving the said plates successively by pressure, a predetermined distance on the tubes so that the shoulders are in binding contact with the surface of the tubes and the flanges in abutting contact relation with each other, disconnecting the locking means of the flared ends of the said tubes, positioning locking nuts on the opposite ends of the tubes and flaring the ends of said tubes and then locking both ends of said tubes to the bosses of an inlet and return header.

In testimony whereof I affix my signature.

PERCIVAL P. HENSHALL.